Sept. 20, 1971  W. H. GODDARD  3,606,192
AUTOMATIC TAKEUP MECHANISM FOR STRIP MATERIAL
Filed April 17, 1970

WILLIAM H. GODDARD
INVENTOR.

BY *Herman Childress*
*Robert W Hampton*
ATTORNEYS

3,606,192
AUTOMATIC TAKEUP MECHANISM FOR STRIP MATERIAL
William H. Goddard, Brockport, N.Y., assignor to
Eastman Kodak Company, Rochester, N.Y.
Filed Apr. 17, 1970, Ser. No. 29,575
Int. Cl. B65h 27/00
U.S. Cl. 242—76                                         7 Claims

ABSTRACT OF THE DISCLOSURE

A takeup mechanism for directing strip material, such as motion picture film, onto a rotatable core in a device for handling such material, includes a plurality of curved guiding fingers for directing the free leading end of the strip material toward the core member for engagement by such core member. Means are provided which are effective automatically in response to strip build-up on the core for moving the ends of the fingers away from the core and out of contact with the strip material.

CROSS REFERENCE TO RELATED APPLICATION

Reference is made to commonly assigned copending U.S. application Ser. No. 798,071, entitled "Takeup Theading Improvement for Automatic Strip Handling Device," filed in the name of John J. Bundschuh, now Pat. No. 3,544,040.

BACKGROUND OF THE INVENTION

Field of the invention

This invention relates to takeup mechanisms for strip material handling devices and, more particularly, to such mechanisms having means for directing strip material onto a takeup core for storage of the material thereon and for moving the directing means away from the material on the core after it has been cinched onto the core.

Description of the prior art

In certain types of strip material handling mechanisms, for example motion picture projectors, takeup reels are provided upon which the strip material, for example motion picture film, is wound for storage after having passed a work point, such as a film gate. With some takeup reels it is necessary for the operator to manually thread the leading free end of the strip onto the takeup reel, and this is often arduous and time consuming. More recently, self-threading takeup reels such as disclosed in U.S. Pat. 3,298,625 to Babcock have been used to simplify the operator's duties.

Earlier self-threading mechanisms have included a plurality of pivotally mounted curved fingers which guide the leading end of the strip material to the reel core where it is picked up by teeth on the reel core, or by other similar means. In many of these devices, the fingers continue to ride on the convolutions of the strip material as it builds up on the core, and this is undesirable due to the resulting friction and wear, particularly where the fingers ride on film and may scratch or otherwise damage the film.

Some attempts have been made in the past to eliminate the undesirable features just referred to. For example, U.S. Pat. 1,346,356 issued July 13, 1920, to W. Wenderhold discloses an automatic threading device wherein the guiding fingers are forced apart, after the film has been threaded, by the action of a roller and lever which are pulled down by the tensioned film. Also, U.S. Pat. 3,395,870 issued Aug. 6, 1968, to S. R. Klinger discloses a tape winding mechanism wherein the guide members are moved toward, and away from, the take-up reel by electrical circuitry.

In order for such mechanisms to be acceptable for fully enclosed takeup mechanisms that ordinarily are not accessible to the operator, they must be capable of operating without malfunction. Also, they should be reasonably simple and inexpensive.

SUMMARY OF THE INVENTION

Accordingly, it is an object of my invention to provide a simple, reliable takeup mechanism for web handling apparatus.

Another object of the invention is to reduce the extent of the frictional contact of film guide members of a film takeup mechanism with the film wound on the reel.

A further object of the invention is to provide improved means for moving film guiding fingers from contact with film on a takeup reel in response to sensing the presence of film on the reel core.

In accordance with the invention, a film takeup mechanism includes a plurality of movable fingers for guiding the free leading end of a film strip toward a core member of a takeup reel so that the film strip is engageable by teeth on the core for securing the film strip to the core. Sensor means detects the presence of film on the reel core and effects movement of the guide fingers to move them automatically out of contact with film on the reel.

The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawing, in which.

DESCRIPTION OF THE PREFERRED EMBODIMENT

Figure 1:
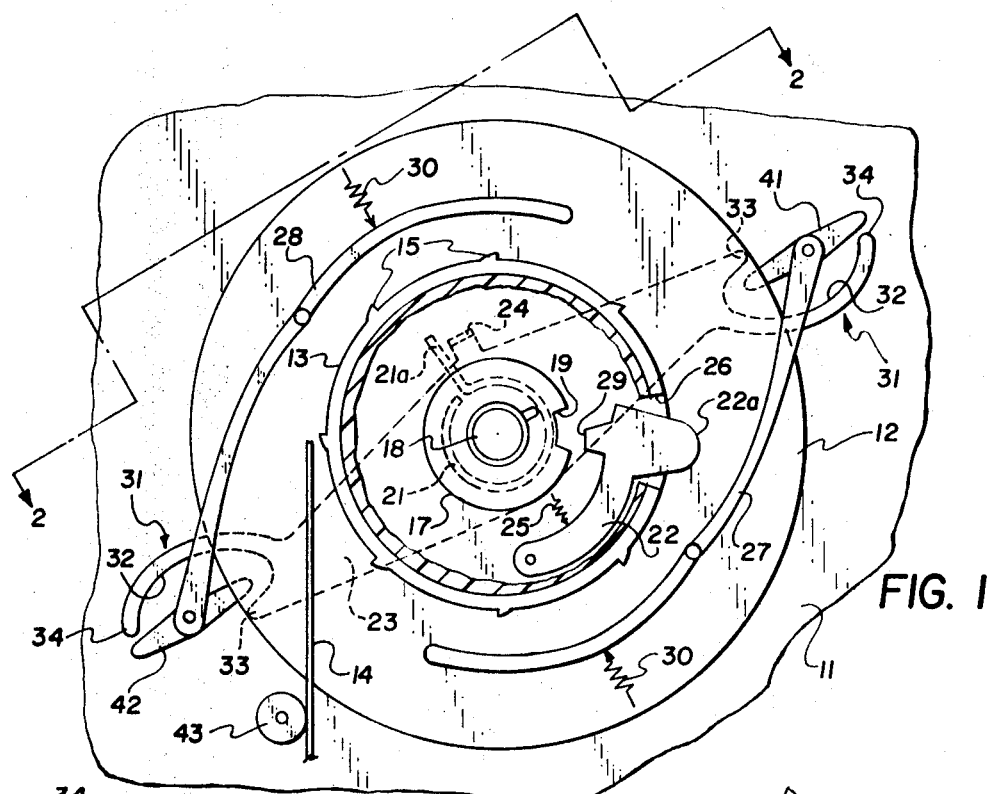
FIG. 1 is a front elevation view of a part of a motion picture film projector or other strip handling apparatus with a portion of the housing being broken away to show a film takeup mechanism of this invention.
Figure 2:
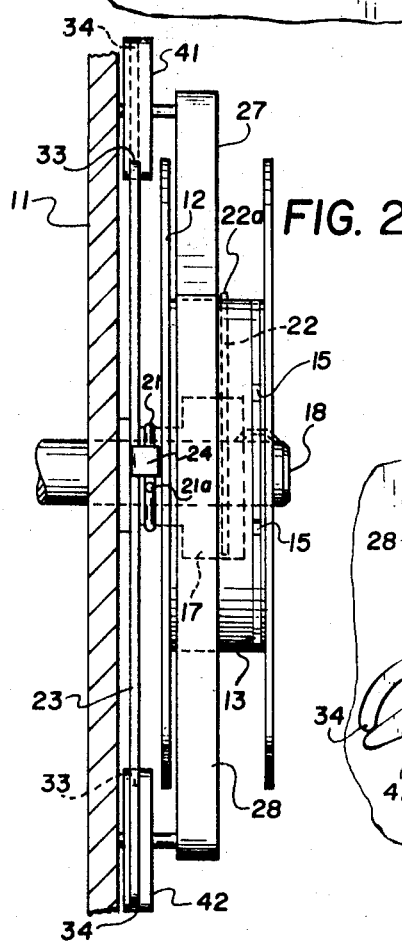
FIG. 2 is a section taken along line 2—2 of FIG. 1.

Referring now to the drawings, and first particularly to FIGS. 1 and 2 a preferred embodiment of the invention is shown incorporated in a motion picture projector which may be for example, generally similar to that disclosed in the before-mentioned copending Bundschuh application, Ser. No. 798,071. In order to avoid unnecessary lengthening of this specification and complication of the drawings, and since a description of such projector may be found in such application, the following description will be directed primarily to the mechanism of the present invention.

In general, the portion of a projector housing 11 shown is that section of the projector housing which is provided for substantially entirely enclosing the take-up reel and associated equipment; it will be understood that other items such as the film supply reel, projector lamp, etc., may be located in other sections of the overall housing as described, for example, in the Bundschuh application mentioned above.

A take-up reel 12 is rotatably mounted in the housing with core 13 of the reel being adapted to have film 14 wound thereon. The reel preferably has spaced teeth 15 for engaging the usual perforations provided in film 14. Take-up reel 12 may be a duo-flanged take-up reel such as disclosed in the Babcock United States Patent 3,298,625 issued Jan. 17, 1967. In FIG. 1 of the drawings, one flange of the reel and a portion of the core are broken away to illustrate more clearly the novel take-up mechanism of this invention.

An idler roller 17 normally "floats" freely (i.e. rotates freely) on a spindle shaft or bearing 18. The idler has a notch 19 in its outer surface. A clutch spring 21 is coiled about the idler and rotates with idler 17 due to frictional engagement or drag of the spring on a diameter of the idler. Spring 21 terminates at its outer end in a straight, outwardly extending, portion 21a the purpose of which will be described subsequently.

A sensor 22 is substantially semi-circular in shape and has an enlarged, button-like head portion 22a at one end portion thereof. The other end portion of the sensor is pivotally mounted on reel core 13 so that the sensor rotates with the reel. The sensor is biased in a clockwise direction (as viewed in the drawings) by suitable spring means diagrammatically shown at 25 so that the sensor is normally in the position shown by solid lines (i.e., out of engagement with idler roller 17) when no film is wound on reel core 13. Normally, head portion 22a of the sensor extends through an opening 26 in the reel core into the space between the reel flanges while other portions of the sensor are located within the reel core. However, the sensor head is movable against the biasing force of spring 25 into a retracted position substantially within the reel core in response to film tension acting on the sensor in the manner described more fully later. A tooth 29 on the sensor is engageable with notch 19 in the idler when the sensor is moved to its retracted position, thereby to latch the idler and reel core together for rotation about the axis of shaft 18.

An actuator lever 23 is rotatably mounted on a suitable bearing surface on the projector frame, which bearing surface surrounds the spindle shaft bearing 18. Lever 23 has two end portions projecting from diametrically opposite sides of the axis of shaft 18, and each end portion has an open "lobster claw" shaped portion 31 on each end. Each portion 31 comprises a notch or opening 32 opening to a side edge of the lever through a neck portion defined by inner and outer lever portions 33 and 34, respectively. As shown in FIG. 1, the necks open in opposite directions. A flange or tab 24 projects from one side of the actuator lever adjacent to the bearing or shaft 18. The tab is located so that it can be engaged by end 21a of spring 21 for rotating the lever either clockwise or counterclockwise as explained later.

Two curved film guide fingers 27 and 28 each are pivotally mounted at one end portion thereof on the projector frame at a diameter that is larger than the flange of reel 12. Each finger is aligned with the space between the reel flanges and is biased by suitable spring means (diagrammatically shown at 30) in a clockwise direction so that the free end portion of each finger is urged toward the reel core. The spring may be, for example, a coil spring positioned around the pivot for each finger as disclosed in the before-mentioned application. The finger may be shaped as disclosed in that application. Fingers 27, 28 are coupled to arms 41, 42, respectively, so that the fingers are rotatable by moving the arms. Fingers 27, 28, arms 41, 42 and the pivots for the fingers can be integrally formed or secured together for conjoint rotation.

It will be noted that, under normal operating conditions, each of the arms 41 and 42 are positioned within the open portions 32 of one of the respective "lobster claw" ends 31 of lever 23 and out of actual contact with the sides thereof. Also, it will be understood that more than two guide fingers may be provided of similar shape to that of fingers 27 and 28. For each additional guide finger, an additional "lobster claw" end would be provided on lever 23.

In the following description it will be assumed that the free or leading end of film 14 is being delivered to the take-up reel mechanism by suitable film feeding means. In this regard, film 14 may be directed into the space between the reel flanges by a guide roller 43 so that the film enters housing 11 with its free or leading end directed toward reel core 13 as shown in FIG. 1. At this time, the free tip ends of the respective guide fingers 27 and 28 (and any additional fingers provided) are positioned closely around core 13 and, in effect, form a partially closed chamber around the core. Consequently, the free end of the film is guided into contact with core 13 by the fingers so that the teeth 15 provided on the core engage perforations in the film for cinching the film onto the reel core. A more complete description of this operation is set forth in the before-mentioned copending application.

Figure 3:
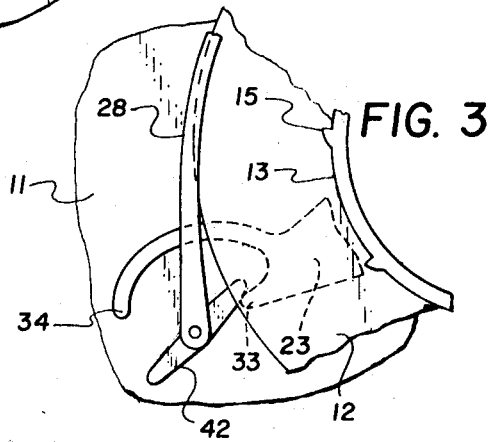
FIGS. 3 and 4 are fragmentary views of part of the mechanism of FIG. 1 showing the actuator rotated to move the guide fingers out of contact with respect to the film on the reel.

After the film is engaged by core 13 and while the initial convolutions are being accumulated thereon by rotation of the reel, the film presses upon the button-shaped head portion 22a of sensor 22 to rotate the sensor counterclockwise, thereby to bring the projecting tooth 29 on the sensor into engagement with notch 19 in idler roller 17 as shown in dotted lines in the drawing. It will be recalled that sensor 22 is pivotally mounted on reel core 13 and rotates therewith. Therefore, when the tooth of sensor 22 becomes seated in the notch in idler roller 17, the roller becomes coupled or latched to the reel core and thereafter rotates with reel 12. Clutch spring 21 rotates with idler roller 17 until the projecting free end 21a of the spring engages flange or tab 24 on actuator lever 23. Then further rotation of the roller and spring causes tab 24 and the entire actuator lever 23 to rotate for a short distance in a clockwise direction to bring the shorter portion 33 of each claw 23 into engagement with the respective arms 41 and 42. This effects rotation of each arm and the associated guide finger 27, 28 in a counterclockwise direction to the position shown in FIG. 3 for arm 28 thereby to move the free ends of the fingers away from the film reel and out of contact with the film.

Figure 4:
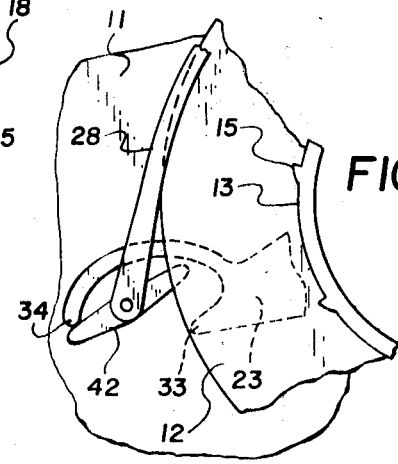

The present invention is equally effective for retracting the fingers when the reel is rotated in a counterclockwise direction for reverse projection or for film rewind. During such counterclockwise rotation, the projecting, free end of clutch spring 21 is brought into contact with the upper edge of tab 24 as shown in FIG. 4, and lever 23 is rotated a short distance in a counterclockwise direction as a result of this contact. This rotation of actuator lever 23 brings the longer or outer portions 34 of the claws of the lever into contact with the respective arms 41 and 42, thereby to again rotate the arms and the guide fingers in a counterclockwise direction to move the respective free ends of the fingers away from the reel core.

This dual effectiveness results from the novel cooperating contours of the double-tipped "lobster claw" ends on the actuator lever and the arms 41, 42 that are normally nestled within the openings in the claw ends for rotation of the arms in a counterclockwise direction regardless of whether rotation of the lever 23 is clockwise or counterclockwise. This operation is entirely automatic. Thus the guide fingers are positioned for guiding the film when that function is required, and they are immediately and automatically moved out of engagement with the film as soon as their guiding function is no longer required. The sensor member is mounted on, and rotatable with, the core and is so positioned as to be moved in response to the presence of convolutions of film as they begin to accumulate on the core. This results in a highly efficient and reliable control.

The invention has been described in detail with particular reference to preferred embodiments thereof, but it will be understood that variations and modifications can be effected within the spirit and scope of the invention.

I claim:
1. An automatic takeup mechanism for a device adapted to handle strips of web material, said mechanism comprising:

a web takeup core supported by the device for rotation about an axis, the core having a surface on which web material is adapted to be wound during rotation of said core, at least one finger mounted on the device for pivotal movement about an axis spaced from the core, the finger having a free end portion movable between a first position wherein the finger is adapted to guide web material toward the core and a second position wherein the finger is spaced from the core and out of position for guiding the web material toward the core, actuating means mounted on the device for moving said finger from its first position to its second position, sensing means carried by said core for detecting the presence of web material on the core, and means for coupling said core to said actuating means for operating said actuating means to effect movement of said finger to its second position in response to said sensing means detecting film on said core.

2. An automatic takeup mechanism as set forth in claim 1 wherein said actuating means comprises a lever member mounted for pivotal movement about an axis, and said lever has a free end portion movable by said coupling means for effecting movement of said finger to its second position, and said mechanism further comprising a spring connected to said finger for urging said finger toward its first position.

3. An automatic takeup mechanism as set forth in claim 1 wherein said sensing means comprises a member connected to said core and having a movable head portion, means urging said head portion above said surface on said core, and said head portion being movable toward said axis of said core in response to web material being wound on said surface.

4. An automatic takeup mechanism as set forth in claim 3 wherein said sensing means further comprises a tooth, said actuating member comprises a lever movable to an actuating position for moving said finger to its second position, and said coupling means comprises an idler member having a notch therein, said notch being adapted to receive said tooth on said member of said sensing means when such member is moved toward said axis of said core, thereby to couple said idler member to said core for conjoint rotation of said idler member and core, and said coupling means further comprises means carried by said idler member for engaging and frictionally urging said lever toward its actuating position in response to rotation of said core.

5. An automatic takeup mechanism as set forth in claim 4 wherein said lever has spaced inner and outer lever portions separated by an opening in the lever, and said mechanism further comprising finger moving means positioned within said opening and coupled to said finger so that said inner lever portion is engageable with said finger moving means for effecting movement of said finger to its second position when said lever is moved in one direction in response to rotation of said core in a first direction and said outer lever portion is engageable with said finger moving means for effecting movement of said finger to its second position when said lever is moved in the opposite direction in response to rotation of said core in a second direction.

6. An automatic takeup mechanism for a device adapted to handle strips of web material, said mechanism comprising:

a web take-up core supported by the device for rotation about an axis in a first direction for taking up such material on the core and for rotation aobut said axis in a second direction during unwinding of such material from the core, at least one finger mounted on the device for movement between a first position wherein the finger is adapted to guide web material toward the core and a second position wherein the finger is spaced from the core and out of position for guiding web material toward the core, an arm coupled to said finger and mounted for pivotal movement about an axis so that pivotal movement of the arm in a first direction effects movement of said finger from its first position toward its second position, said arm having first and second end portions on opposite sides of its axis of movement, actuating means for moving said arm in said first direction during rotation of said core in either its first direction or its second direction, said actuating means comprising a lever member mounted for pivotal movement about an axis and having a free end portion comprising inner and outer portions separated by an opening in the lever, said arm being positioned within said opening and having its first end portion engagable by said inner lever portion during movement of the lever in a first direction and having its second end portion engageable by the outer lever portion during movement of the lever in a second direction, and means coupled to said core and to said lever member for effecting movement of said lever member in its first direction in response to rotation of said core in one direction and for effecting movement of said lever member in its second direction in response to rotation of said core in the opposite direction.

7. An automatic takeup mechanism as set forth in claim 6 further comprising sensor means carried by said core for detecting the presence of web material on the core, said sensor means effecting coupling of the core to the lever member in response to detecting the presence of such web material on the core.

References Cited

UNITED STATES PATENTS

| | | | |
|---|---|---|---|
| 1,346,356 | 7/1920 | Wenderhold | 242—74X |
| 3,090,574 | 5/1963 | Doncaster et al. | 242—198X |
| 3,395,870 | 8/1968 | Klinger | 242—76X |
| 3,401,900 | 9/1968 | Lutz | 242—56.1 |
| 3,544,040 | 12/1970 | Bundschuh | 242—206 |

LEONARD D. CHRISTIAN, Primary Examiner

U.S. Cl. X.R.

242—74, 179, 187; 352—157